United States Patent
Forman et al.

(10) Patent No.: US 7,688,379 B2
(45) Date of Patent: Mar. 30, 2010

(54) SELECTING QUALITY IMAGES FROM MULTIPLE CAPTURED IMAGES

(75) Inventors: George H. Forman, Palo Alto, CA (US); Suk Hwan Lim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 11/299,024

(22) Filed: Dec. 9, 2005

(65) Prior Publication Data

US 2007/0132874 A1 Jun. 14, 2007

(51) Int. Cl.
*G03B 13/00* (2006.01)
*G06K 9/60* (2006.01)

(52) U.S. Cl. .................. 348/356; 348/353; 382/305

(58) Field of Classification Search ......... 348/333.02, 348/362, 353–356; 382/305
See application file for complete search history.

(56) References Cited

U.S. PATENT DOCUMENTS

| | | | | |
|---|---|---|---|---|
| 6,341,179 B1 * | 1/2002 | Stoyle et al. | ................ | 382/254 |
| 6,486,915 B2 * | 11/2002 | Bell et al. | ................... | 348/362 |
| 6,930,718 B2 * | 8/2005 | Parulski et al. | ........ | 348/333.11 |
| 2003/0068100 A1 * | 4/2003 | Covell et al. | ................ | 382/305 |

FOREIGN PATENT DOCUMENTS

JP 2000125185 A * 4/2000

OTHER PUBLICATIONS

Suk Hwan Lim, et al; U.S. Appl. No. 11/031,877, filed Jan. 7, 2005, entitled 'Method and System for Determining An Indication of Focus of an Image'.

* cited by examiner

*Primary Examiner*—Lin Ye
*Assistant Examiner*—Mekonnen Dagnew

(57) ABSTRACT

A method, apparatus, and system are disclosed for selecting quality images from multiple captured images. One embodiment is an image capturing system. The system includes hardware for capturing a plurality of consecutive images and a processor for determining a quality indication for the consecutive images and for selecting one of the consecutive images based on the quality indication.

14 Claims, 4 Drawing Sheets

SELECTING QUALITY IMAGES FROM MULTIPLE CAPTURED IMAGES

BACKGROUND

Digital images can become blurred when the image is initially captured. When taking digital pictures in low light situations, the shutter stays open for a relatively long period of time. During this time, if the image capturing device shakes or if the object moves, then the captured image is blurred.

Movement of the image capturing device or the object can be difficult to control. Some pictures are taken from moving vehicles that impart motion to the user or image capturing device. Other pictures are taken of moving objects, such as people or objects in sporting events. Thus, even if the user steadily holds the image capturing device, movement of the object being captured can cause blur in the resultant image.

Some image capturing devices, such as digital cameras, enable users to immediately view the captured image on a display. If the captured image appears blurry, then the image can be deleted or possibly another image taken. This process is repeated until the user is satisfied with the quality of the captured image.

Many different mechanisms exist to prevent blur from occurring or remove blur once it occurs. For example, flashes and other lighting reduce the exposure time and minimize the occurrence of blur. Flashes are not always available or permitted and are ineffective when the target object is located a great distance from the camera.

As another example, tripods stabilize cameras while the image is being captured. A tripod, however, is not completely effective if the image moves. Further, tripods and other stabilizing equipment are not always readily available.

Most digital cameras include auto-focus settings to improve the quality of captured images. Even with auto-focus though, images can still be out-of-focus or blurred due to motion of the camera during capture or failure of the auto-focus function (example, when the digital camera fails to find an appropriate focus for any part of the image). Users can still download captured images to a personal computer and manually view each image to determine which ones are blurred. Such determinations are time consuming and difficult, especially if the display device is small or the spatial resolution is limited.

DETAILED DESCRIPTION

Exemplary embodiments in accordance with the present invention are directed to systems, methods, and apparatus for analyzing focus quality for plural images and selecting at least one of the images. In one exemplary embodiment, a plurality of images is captured in a sequence, such as rapid or continuous capture of multiple images. An indication of focus (example, sharpness or blurriness) is determined for each captured image. These indications of focus are then ranked according to a ranking algorithm. A selection is then made of at least one of these images according to the rankings. The selected image is stored, presented to a user, or transmitted.

Figure 1:
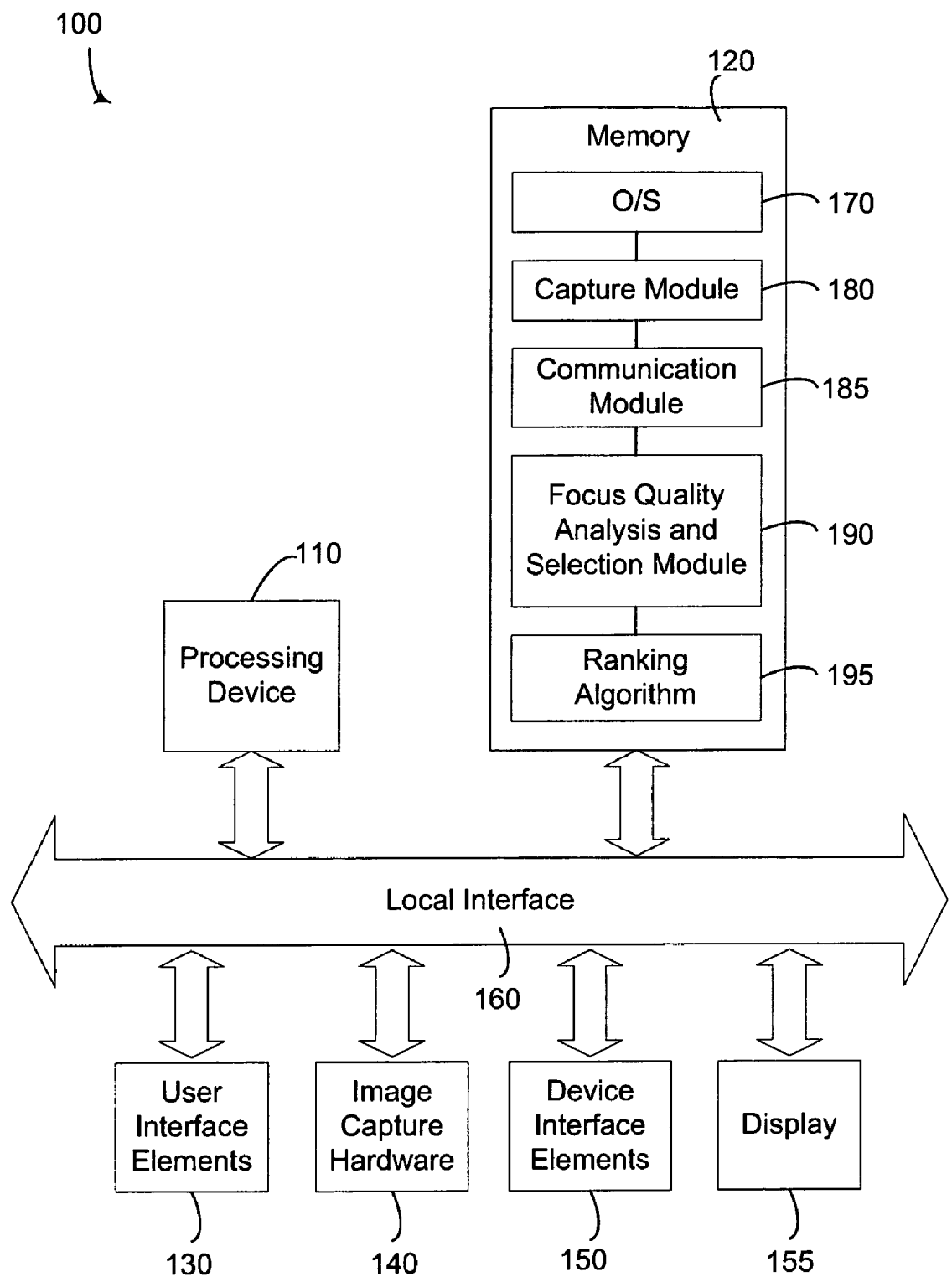
FIG. 1 illustrates a schematic view of an exemplary image capturing device in accordance with an embodiment of the present invention.

Embodiments in accordance with the invention are utilized with various systems and apparatus. FIG. 1 illustrates an exemplary apparatus as an image capturing device 100 for determining analyzing focus quality for a plurality of images in a sequence, ranking these images, and then selecting at least one of these images according to the rankings.

The image capturing device 100 comprises a processing device 110, memory 120, user interface elements 130, image capture hardware 140, device interface elements 150, a display 155, and a bus or local interface 160 to which each of the other components electrically connects. The processing device 110 executes commands stored in memory 120 and comprises a general-purpose processor, a microprocessor, one or more application-specific integrated circuits (ASICs), a plurality of suitably configured digital logic gates, and/or other electrical configurations to coordinate and process the overall operation of the image capturing device 100.

The user interface elements 130 comprise interface tools with which the device settings are changed and through which the user communicates commands to the image capturing device 100. By way of example, the interface elements 130 comprise one or more functional buttons or modes with which the image capturing device 100 is controlled or commanded to capture images. Further, the user interface elements 130 include, but are not limited to, an optional user input device (example, a keyboard or a mouse) and an optional input/output (I/O) device used to couple the image capturing device 100 to a network.

The image capture hardware 140 comprises various components used to physically capture images. If the image capture device 100 includes a portable or non-portable digital camera (still and/or video), the image capture hardware 140 includes, for example, a lens, one or more focusing elements (lenses, mirrors, etc.), one or more light sensing elements (example, charge-coupled device (CCD)), or viewfinder, to name a few examples.

The device interface elements 150 facilitate the transfer of image data from the image capturing device 100 to other devices, such as computing devices and peripheral devices. By way of example, these interface elements comprise a data transmitting/receiving device and one or more communication ports. In one exemplary embodiment, communications or data transmission is wireless or conducted through direct electrical connection.

In one embodiment, the image capturing device 100 comprises a user output device, such as display device 155. The display is coupled to local interface or bus 160 for displaying information, such as stored or captured images to the user. In one exemplary embodiment, the display 155 is a liquid crystal display (LCD) that displays graphical images and alphanumerical characters recognizable to a user of the image capturing device 100.

The memory 120 includes an operating system 170, an image capture module 180, a communication module 185, a focus quality analysis and selection module 190, and a ranking algorithm 195. The operating system 170 contains various commands used to control the general operation of the image capturing device 100. The image capture module 180 comprises software and/or firmware that facilitates the capture (i.e., retrieval and storage) of images in conjunction with the image capture hardware 140. Accordingly, the operating system 170 preferably controls the general operation of the device 100, while the image capture module 180 controls image capturing operations. The communication module 185 comprises software and/or firmware that communicates with other devices in conjunction with the device interface elements 150. The communication module 185, for example, communicates with other computing and peripheral devices. In one exemplary embodiment, captured image data is displayed, outputted, or otherwise manipulated by these other devices.

The image capturing device 100 also comprises a focus quality analysis and selection module 190 for determining an indication of focus or sharpness for images and for selecting at least one of the images based on rankings or scoring from the ranking algorithm 195. The focus quality analysis and selection module 190 and ranking algorithm 195 are implemented as software, hardware, firmware, or any combination thereof. In one embodiment, the focus quality analysis and selection module 190 and ranking algorithm are implemented as computer instructions stored in memory 120 for instructing the processing device 110 to determine an indication of focus or sharpness for plural images, rank the images, and select at least one of the images according to the ranking. Images are stored in volatile memory, non-volatile memory, or a data storage device.

In one exemplary embodiment, the image capturing device 100 is an electronic device, such as, but not limited to, a digital camera (still and/or video), personal digital assistant (PDA), cellular or mobile telephone, a web camera, a satellite, computing device, a surveillance camera, digital imaging devices, or other portable or non-portable electronic computing devices. Further, the image capturing device 100 is not limited to an apparatus but includes computer and electronic systems. In one exemplary embodiment, the image capturing device 100 connects to a separate computing device (example, a personal computer or server) and/or connects to a network, such as the internet.

Figure 2:
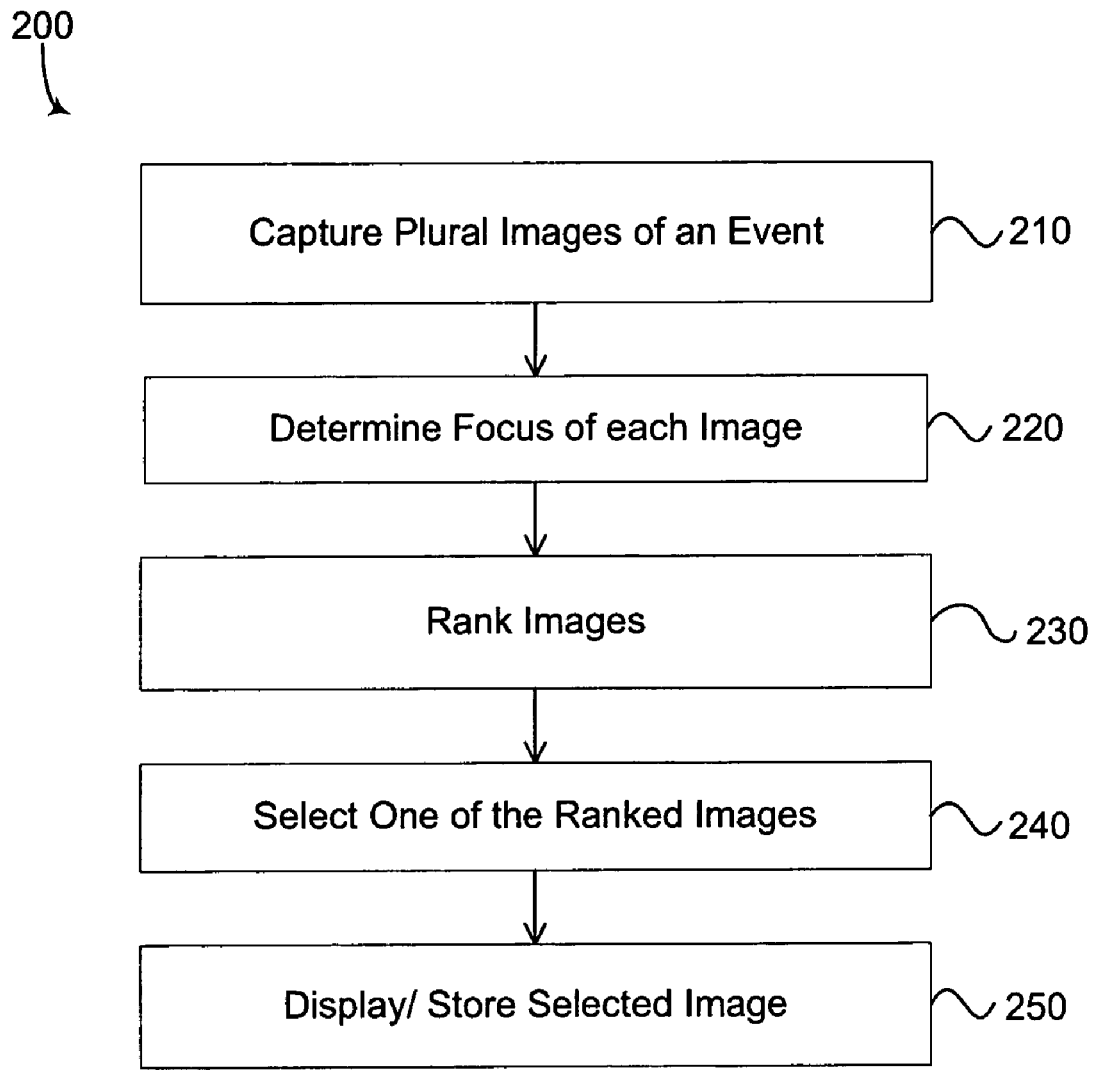
FIG. 2 illustrates an exemplary flow diagram for analyzing focus quality and selecting at least one of plural images in accordance with an embodiment of the present invention.

FIG. 2 illustrates an exemplary flow diagram 200 for analyzing focus quality and selecting at least one of plural images in accordance with an embodiment of the present invention. According to one exemplary embodiment, the flow diagram 200 is embodied in the focus quality analysis and selection module 190 and ranking algorithm 195 of FIG. 1.

According to element 210, plural images of an object or event are captured, generated, or retrieved (example, retrieved from local or remote memory or storage). In one exemplary embodiment, the images are captured in a sequence as a continuous or connected series of related images, such as images captured in a succession of repetitions or in consecutive order. As one example, plural images (i.e., two or more) are captured in rapid succession to generate a series of related images of an object or event.

For discussion purposes, assume for example that the image capturing device is a digital camera. In order to capture a series of images, the user presses down and holds an image capture button on the digital camera. During this time, the digital camera rapidly captures a series or sequence of full-resolution snapshots of a particular object or event. In one embodiment, the captured images are taken of the same or substantially similar objects or events. Further, in one exemplary embodiment, a rapid succession of images is taken while the user "half-presses" a button on the digital camera.

While image capturing is activated or occurring, the image capturing device rapidly continues to take and store pictures. The number of images captured during a given time period varies depending on, for example, architecture of the image capturing device, user preferences, software programming, capabilities of the image capture hardware, etc. By way of example, two or more images are captured for every second that image capturing is activated. Embodiments in accordance with the invention, though, are not limited to any particular number or rate of captured images. Some image capturing devices, such as devices capable of capturing video data, capture and record numerous images or frames each second.

According to element 220, a determination of focus or sharpness is made for each captured image. In one exemplary embodiment, an indication of focus (example, sharpness or blurriness) for each image in the sequence is determined. The indication of focus is discussed in more detail in connection with FIG. 4. Briefly, each image is divided into non-overlapping blocks and local measures, such as average sharpness, average brightness, and average color saturation for each block. From matrices of local measures, global figure-of-merits are computed that represent certain aspects of how well-focused the images are. Examples of these global figure-of-merits are composition, overall sharpness, and relative brightness of the foreground versus the background. The focus of the whole image is assessed using the global figure-of-merits. Exemplary systems and methods are taught in U.S. patent application Ser. No. 11/031,877, entitled "A Method and System for Determining an Indication of Focus of an Image" and incorporated herein by reference.

According to element 230, once an indication of focus is determined, each image is ranked. In one exemplary embodiment, a ranking algorithm or scoring function ranks the images according to one or more factors, such as the indication of focus and/or time when the image was captured, to name a few examples. For example, each image is given a score that reflects how blurry or sharp the image is. Images in the sequence having less blurriness or more sharpness are given a higher score or rank. Images in the sequence having more blurriness or less sharpness are given a lower score or rank.

According to element 240, a selection is made of at least one of the ranked images. The results of the ranking algorithm or scoring function are used to determine which image in the sequence to select. For example, the image with the best score (i.e., the image being most sharp or having the least amount of blurriness) is selected. In one embodiment, the selected image represents the picture having the best quality from the sequence of images.

In one exemplary embodiment, an indication of focus indicates whether an image is well-focused or ill-focused (example, whether the foreground is sharp or blurred). In another embodiment, the indication of focus is a numerical value that indicates how well an image is focused (example, a value in a range of 1 to 10, where the number 1 represents ill-focused and the number 10 represents well-focused). In other embodiments, the indication of focus is used to automatically perform actions with the image. For example, if the indication of focus is below a minimum threshold or value, the image is automatically deleted.

If two images have a similar or same score, then one or more other factors are used to select one of the images. For example, the ranking algorithm provides a score or weight to the age of the image. More recent images (i.e., images being captured later in time) are provided with a higher score. By contrast, older images are provided with a lower score. When two images have a same indication of focus, the most recent image (i.e., the image captured later in time) is selected.

In one embodiment, the focus quality analysis and selection module 190 and ranking algorithm 195 are activated as a mode of operation in the image capturing device. Activation of this mode occurs manually or automatically. In manual activation, a user of the image capturing device manually activates or selects this mode of operation before capturing the images. For instance, the user holds down on a button for a period of time to activate or de-activate the mode. Alternatively, the image capturing device itself automatically activates and de-activates this mode. For instance, a sensor in the image capturing device senses lighting conditions before an image is captured and activates or de-activates the mode based on the sensed light. Alternatively, the image capturing device measures motion or blur to determine when to activate and de-activate the mode.

According to element 250, the selected image is stored, transmitted, or presented to a user. In one embodiment, the selected image is automatically stored and displayed on a display to the user. In one exemplary embodiment, the non-selected images are deleted. In another exemplary embodiment, the non-selected images are stored, transmitted, and/or presented to a user.

For discussion purposes, assume the example wherein the image capturing device is a digital camera. The user holds down or activates the image capture button for several seconds. During this time, numerous pictures are captured (example, 8-10 images are captured and stored) of a substantially similar or same object or event. The focus quality analysis and selection module or algorithm determines an indication of focus for each of the images. The images are then ranked or scored according to the ranking algorithm. The image with the highest or best score is displayed to the user on a display of the camera. In other words, the camera automatically examines each of the 8-10 images to determine which image has the best quality (example, least blurriness or most sharpness). This selected image is saved and presented to the user as the selected image from the sequence.

Figure 3:
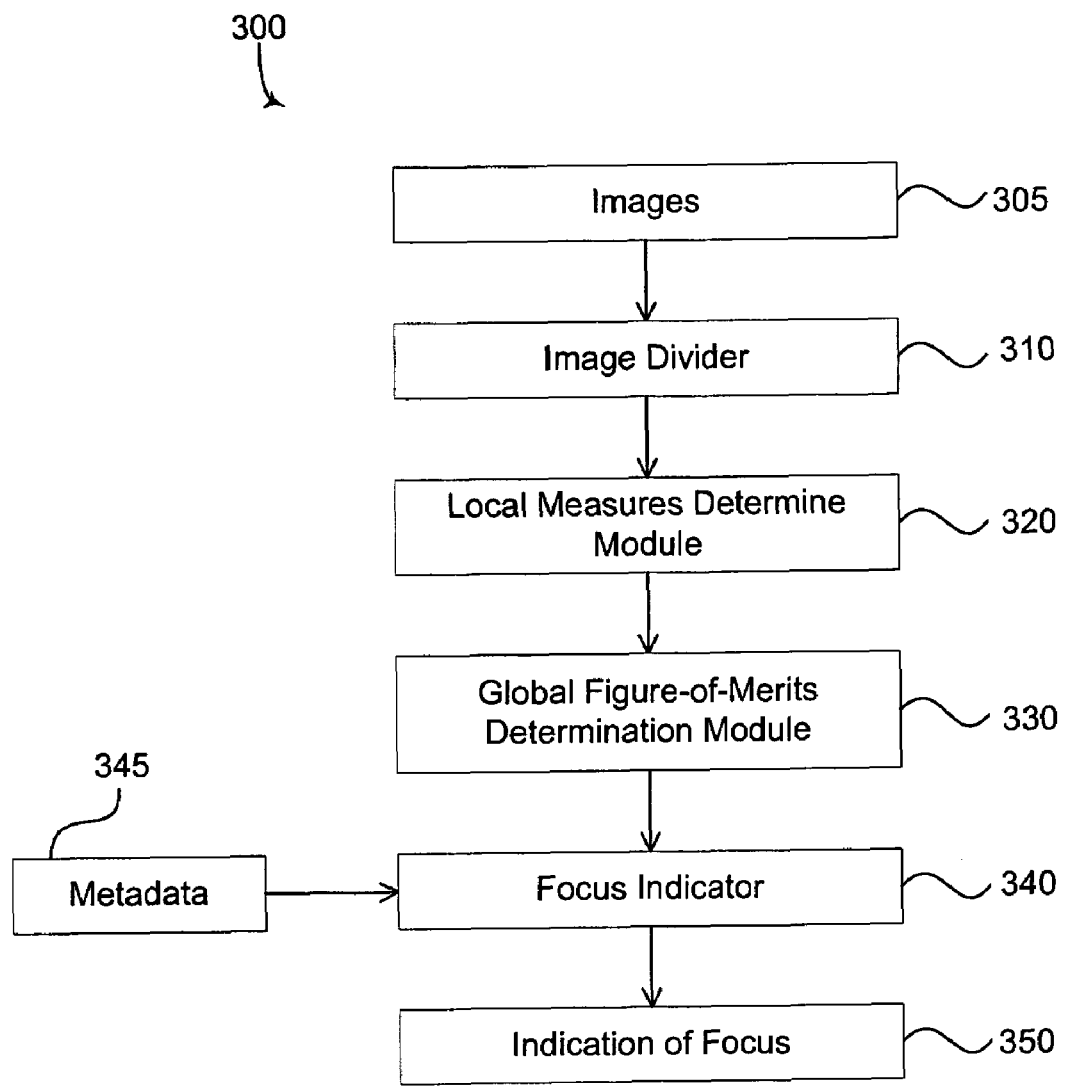
FIG. 3 illustrates an exemplary flow diagram of a system for determining indications of focus for plural images in a sequence in accordance with an embodiment of the present invention.

FIG. 3 illustrates an exemplary flow diagram 300 of a system for determining indications of focus for plural images in a sequence in accordance with an embodiment of the present invention. In one exemplary embodiment, system 300 is implemented within an electronic device (example, the focus quality analysis and selection module 190 of FIG. 1). The indications of focus are used to determine focus for images as discussed in connection with element 220 of FIG. 2. Further, embodiments in accordance with the invention can utilize various methods and systems for determining focus quality. FIG. 3 illustrates one exemplary embodiment in accordance with the invention.

System 300 includes image divider 310, local measures determination module 320, global figure-of-merits determination module 330, and focus indicator 340. The components of system 300 are implemented within software, hardware, firmware, or any combination thereof. Further, in some exemplary embodiments, the components are included within a single electronic device, included in multiple electronic devices, or distributed over a computer network.

As shown in element 305, plural images are acquired and provided to system 300. These images are captured, generated, or retrieved as discussed in connection with element 210 of FIG. 2.

The image divider 310 receives the plurality or sequence of images 305 and divides the images into a plurality of blocks of image data or pixel data. In one embodiment, the blocks are non-overlapping blocks. The number of blocks image divider 310 divides images 305 into is a design parameter and represents computing tradeoffs of accuracy versus computational efficiency. In general, the number of blocks is proportional to the image size. Smaller images have smaller block sizes, and larger images have larger block sizes.

In one embodiment, the optimal block size is determined by optimally selecting parameters, such as a decimation factor and a threshold value for edge detection, used in determining a local sharpness measure. In one embodiment, the parameters are chosen that maximize a dynamic range of the sharpness values. The smallest threshold and block size that provides a good dynamic range while still being consistent is chosen.

Local measures determination module 320 computes various local measures for the blocks of images 305. These local measures include, but are not limited to, the following: a sharpness measure, an average brightness, an average color saturation, a sky determination, a snow determination, and a saturation determination. Any number of local measures is used, and embodiments of the present invention are not limited to the described local measures.

The global figure-of-merits determination module 330 computes various global figure-of-merits for images 305 based on the local measures. A number of global figure-of-merits are calculated by global figure-of-merits determination module 230, including but not limited to: composition, brightness index, color saturation index, density of sharp blocks, and median of sharpness values.

Since some parts of the image are blurry while some other parts are sharp, a single sharpness value is not necessarily truly representative of how well the whole image is focused. Using local measures and more than one global figure-of-merit allows for the detection of images that are focused on the background in addition to the images that are blurry. In one embodiment, plural global figure-of-merits are calculated for detecting if the images are ill-focused.

The focus indicator 340 determines an indication of focus 350 for each of the images 305. This determination is based on the global figure-of-merits as determined in global figure-of-merits determination module 330. In one embodiment, the indication of focus 350 is also based on metadata 345 (example, Exchangeable Image File metadata). In one embodiment, the metadata 345 is used to verify and weigh the analysis.

In one exemplary embodiment, the indications of focus 350 are provided to rank the various images in the sequence of images. The indications are provided to the ranking algorithm or scoring function as discussed in connection with element 230 of FIG. 2.

Figure 4:
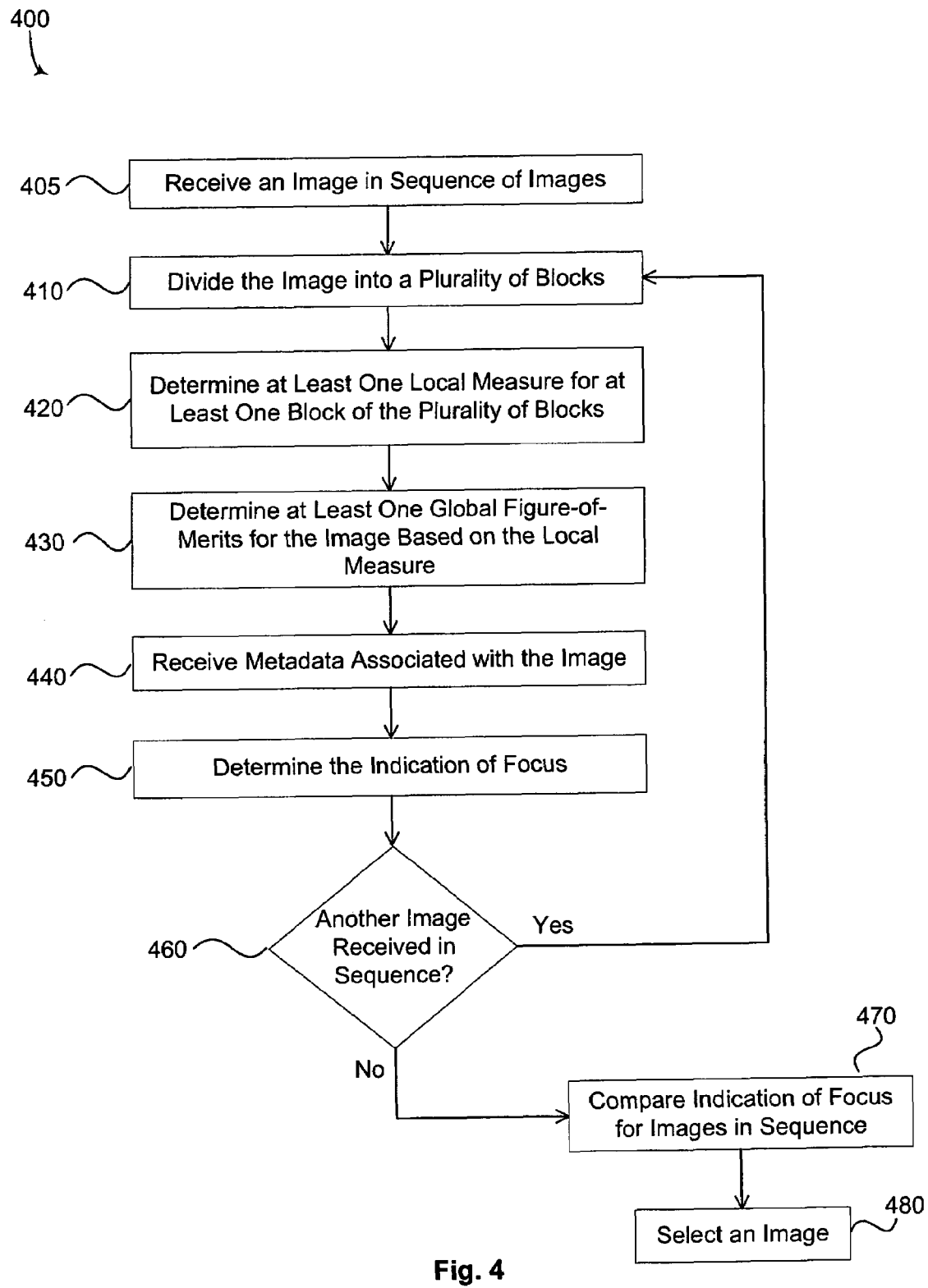
FIG. 4 illustrates another exemplary flow diagram for analyzing focus quality and selecting at least one of plural images in accordance with an embodiment of the present invention.

FIG. 4 illustrates an exemplary flow diagram 400 for analyzing focus quality and selecting at least one of plural images in accordance with an embodiment of the present invention. In one embodiment, the flow diagram 400 is carried out by one or more processors and electrical components (example, in image capturing device 100 of FIG. 1) under the control of computer readable and computer executable instructions.

According to element 405, images are received. In one embodiment, the images are located in storage of an image capturing device (example, volatile or non-volatile memories or a data storage medium). Alternatively, each image is captured with an image capturing device 100 of FIG. 1.

At element 410, each of the plural images is divided into a plurality of blocks. In one embodiment, the blocks are non-overlapping blocks.

According to element 420, at least one local measure for at least one block is determined. Any one or more of local measures are determined, including but not limited to: a sharpness measure, an average brightness, an average color saturation a sky determination, a snow determination, and a saturation determination.

According to element 430, at least one global figure-of-merits for the image is determined based on the local measure. Any one or more of global figure-of-merits are determined, including but not limited to: composition, brightness index, color saturation index, density of sharp blocks, and median of sharpness values.

According to element 440, in one embodiment, metadata associated with the images is received. In one embodiment, the metadata is EXIF metadata.

According to element 450, an indication of focus for the images is determined based on the global figure-of-merits. In one embodiment, the indications of focus are determined based on the global figure-of-merits and the metadata. In one embodiment, the indications of focus provide an indication of blurriness or sharpness of the images.

According to element 460, an inquiry is made as to whether additional images are in the sequence of images or additional images are being presented (whether in the sequence or not). If the answer to this inquiry is "yes," then flow proceeds back to element 410. If the answer to this inquiry is "no," then flow proceeds to element 470.

According to element 470, a comparison is made of the indications of focus for the images. The images are compared to determine which image has the highest or best quality (example, which image has the best focus or least blur).

According to element 480, at least one of the images is selected. The image is selected based on the calculated results of the comparison in element 470. Once the image is selected, it is presented on a display screen of an electronic device, such as the image capturing device.

In addition to presenting the selected image, other information is presented to the user on a display. In one embodiment, the information includes the indication of focus (example, the score or rank), a number of images in the sequence, a number of images saved and/or deleted, etc. In another embodiment, the information is a message related to sharpness blurriness of one or more of the images in the sequence.

The selection and ranking of images is not limited to using focus or sharpness. An indication of focus is merely one exemplary indication for automatically analyzing images and selecting one of the images in a sequence. In one exemplary embodiment, the image capturing device analyzes or uses several different or possible capture parameters to select at least one of the images. These other capture parameters include, but are not limited to, lens position (i.e., location of the focal plane with respect to the sensor), exposure time (i.e., shutter speed), depth of focus or f-stop (i.e., an expression of the diameter of the diaphragm aperture in terms of effective focal length of the lens), or white balance, to name a few examples.

Further, embodiments in accordance with the present invention are not limited to a single quality indication or parameter for analyzing and selecting an image from plural images. In one embodiment, multiple parameters in an image quality assessment algorithm are used to select and rank images. For example, the image quality assessment algorithm includes one or more of the following parameters: indication of focus (i.e., sharpness), a noisiness estimator, lighting detector, color correction estimator, and other parameters discussed in this disclosure. In one embodiment, the image capturing device captures multiple images and executes the image quality assessment algorithm to select the image with the best image quality. In one embodiment, the image capturing device automatically varies or changes the parameters used to capture images while plural images in a sequence are being captured. For example, a first image in a sequence is captured with a first exposure time; a second image in the sequence is captured with a second different exposure time; a third image in the sequence is captured with a third different exposure time, etc. For instance, the image capturing device automatically varies the shutter speed in five millisecond increments with each image in a sequence of images. The image with the best quality is then selected for the user. Other parameters discussed in this disclosure can be varied for each picture in a sequence as well.

In one exemplary embodiment, the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the elements should not be construed as steps that must proceed in a particular order. Additional elements/steps may be added, some elements/steps removed, or the order of the elements/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the image capturing device of FIG. 1, a computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An image capturing system, comprising:
hardware for capturing a plurality of consecutive images; and
a processor for determining a quality indication of sharpness for the consecutive images by:
dividing each of the consecutive images into non-overlapping blocks of data;
computing local measures for the non-overlapping blocks of data; using the local measures to compute global measures to represent how well-focused the consecutive images are, wherein the processor selects one of the consecutive images based on the quality indication of sharpness;
wherein the local measures include one of average sharpness, average brightness, and average color saturation; and the global measures include one of brightness index, color saturation index, density of sharp blocks, and median of sharpness values.

2. The image capturing system of claim 1 further comprising a display for displaying both the one image selected from the consecutive images and an indication of focus for the one image selected from the consecutive images.

3. The image capturing system of claim 1, wherein when two images have a similar or same score for blurriness, then using another factor other than blurriness to select one of the two images.

4. The image capturing system of claim 1 further comprising, using multiple values of sharpness of an image to determine how well the image is focused since some parts of the image are blurry while other parts of the image are focused.

5. The image capturing system of claim 1, wherein the processor further automatically varies, without input from a user, parameters used to capture each image of the consecutive images in order to vary quality of the consecutive images.

6. The image capturing system of claim 1, wherein the processor further determines an indication of focus for each of the consecutive images and ranks the consecutive images based on the determined indication of focus for the consecutive images.

7. An image capturing system, comprising:
hardware to capture a series of related images with a digital camera; and processing device to:
divide each of the related images into non-overlapping blocks of pixel data;
compute local measures for the non-overlapping blocks of pixel data; use the local measures to compute global measures to determine blurriness of the related images; and
execute a module, wherein the module selects, based on a comparison of the blurriness of the related images, one of the images in the series; and
wherein the local measures include one of average sharpness, average brightness, and average color saturation; and the global measures include one of brightness index, color saturation index, density of sharp blocks, and median of sharpness values.

8. The image capturing system of claim 7 further comprising, a ranking algorithm to rank the series of related images based on indications of focus for the images.

9. The image capturing system of claim 7, wherein when two images have a similar or same score for blurriness, then using another factor other than blurriness to select one of the two images.

10. The image capturing system of claim 7 further comprising, using multiple values of blurriness of an image to determine how well the image is focused since some parts of the image are blurry while other parts of the image are focused.

11. The image capturing system of claim 7, wherein the one of the images in the series is a higher quality image than other images in the series.

12. The image capturing system of claim 7, wherein the images in the series are ranked based on when in time an image in the series is captured.

13. The image capturing system of claim 7, wherein the one of the images in the series is stored and the other images, in the series are automatically deleted.

14. The image capturing system of claim 7, wherein the processing device further automatically determines, without input from a user, indications of focus for the images in the series and automatically selects, without input from a user, an image having a higher quality of focus.

* * * * *

UNITED STATES PATENT AND TRADEMARK OFFICE
CERTIFICATE OF CORRECTION

PATENT NO. : 7,688,379 B2  Page 1 of 1
APPLICATION NO. : 11/299024
DATED : March 30, 2010
INVENTOR(S) : George H. Forman et al.

It is certified that error appears in the above-identified patent and that said Letters Patent is hereby corrected as shown below:

In column 10, line 35, in Claim 13, delete "images," and insert -- images --, therefor.

Signed and Sealed this

Fifteenth Day of June, 2010

David J. Kappos
*Director of the United States Patent and Trademark Office*